United States Patent [19]
Dorma

[11] Patent Number: 5,259,117
[45] Date of Patent: Nov. 9, 1993

[54] CUTTING TOOL

[76] Inventor: Edward Dorma, 902 Windsor Dr., Sarasota, Fla. 34234

[21] Appl. No.: 44,151

[22] Filed: Apr. 8, 1993

[51] Int. Cl.⁵ .............................................. B26B 13/00
[52] U.S. Cl. ........................................ 30/258; 30/249
[58] Field of Search ................. 30/155, 177, 134, 188, 30/191, 258, 254, 249

[56]  References Cited
U.S. PATENT DOCUMENTS

| | | | |
|---|---|---|---|
| 113,670 | 4/1871 | Howell | 30/188 |
| 1,689,648 | 10/1928 | Voleske | 30/188 |
| 1,915,404 | 6/1933 | Clifton | 30/191 |
| 2,975,518 | 3/1961 | Nelson | 30/258 |
| 4,434,555 | 3/1984 | Stoll | 30/258 |

Primary Examiner—Douglas D. Watts
Assistant Examiner—Paul M. Heyrana, Sr.
Attorney, Agent, or Firm—Burd, Bartz & Gutenkauf

[57] ABSTRACT

A hand tool having a pair of pivotally connected handles connected to a cutting blade and anvil so that on movement of the handles toward each other the blade rotates toward the anvil and the anvil moves toward the blade to cut an object located between the blade and anvil.

22 Claims, 4 Drawing Sheets

CUTTING TOOL

FIELD OF INVENTION

The invention relates to hand tools for cutting objects, such as wood and the like. The hand tool has moveable arms that rotate a cutting blade and move an anvil toward the cutting blade to cut an object that is located between the cutting blade and the anvil.

BACKGROUND OF INVENTION

Hand operated cutting tools and shears have elongated lever arms that are pivotally connected to move a blade, having a knife edge, toward a jaw to cut wood branches and the like. A pivot bolt connects the arms together so that upon movement of the handles toward each other, a cutting action is achieved by relative movement of the knife and jaw. In some cutting tools, the jaws have concave shapes to cradle the branches in the jaws. The knives have convex shapes, which move toward the convex jaws to cut the objects cradled in the jaws. Considerable force must be applied to the handles of these tools to cut thick and tough wood and branches.

SUMMARY OF INVENTION

The invention is an improved handle cutting tool for cutting objects, such as tree branches, wood, plastic, metal and the like. The cutting tool is pivotally connected to members operable to rotate a cutting blade and move an anvil toward the rotating cutting blade to effect cutting action of an object located between the cutting blade and the anvil. The object to be cut is forced into the cutting blade as the cutting blade rotates and saws its way through the object.

The cutting tool has a first handle that accommodates an anvil. The anvil has a body that is slideably located within the outer end of the handle. A second handle is pivotally mounted on the first handle with a pivot pin. A cutting blade is pivotally mounted on the pin and connected to the second handle with an elongated arm whereby movement of the first and second handles relative to each other, will rotate the cutting blade. A pin connects the cutting blade with the anvil so that when the cutting blade is rotated, the anvil is moved toward the cutting blade. This forces the object into the cutting blade during the rotation of the cutting blade. The sawing action of the cutting blade combined with the movement of the object to be cut into the cutting blade enables the user to cut relatively large and tough objects with a moderate amount of force applied to the handles. The blade can be removed and replaced with a new blade having sharp cutting teeth.

DESCRIPTION OF PREFERRED EMBODIMENT

Figure 1:
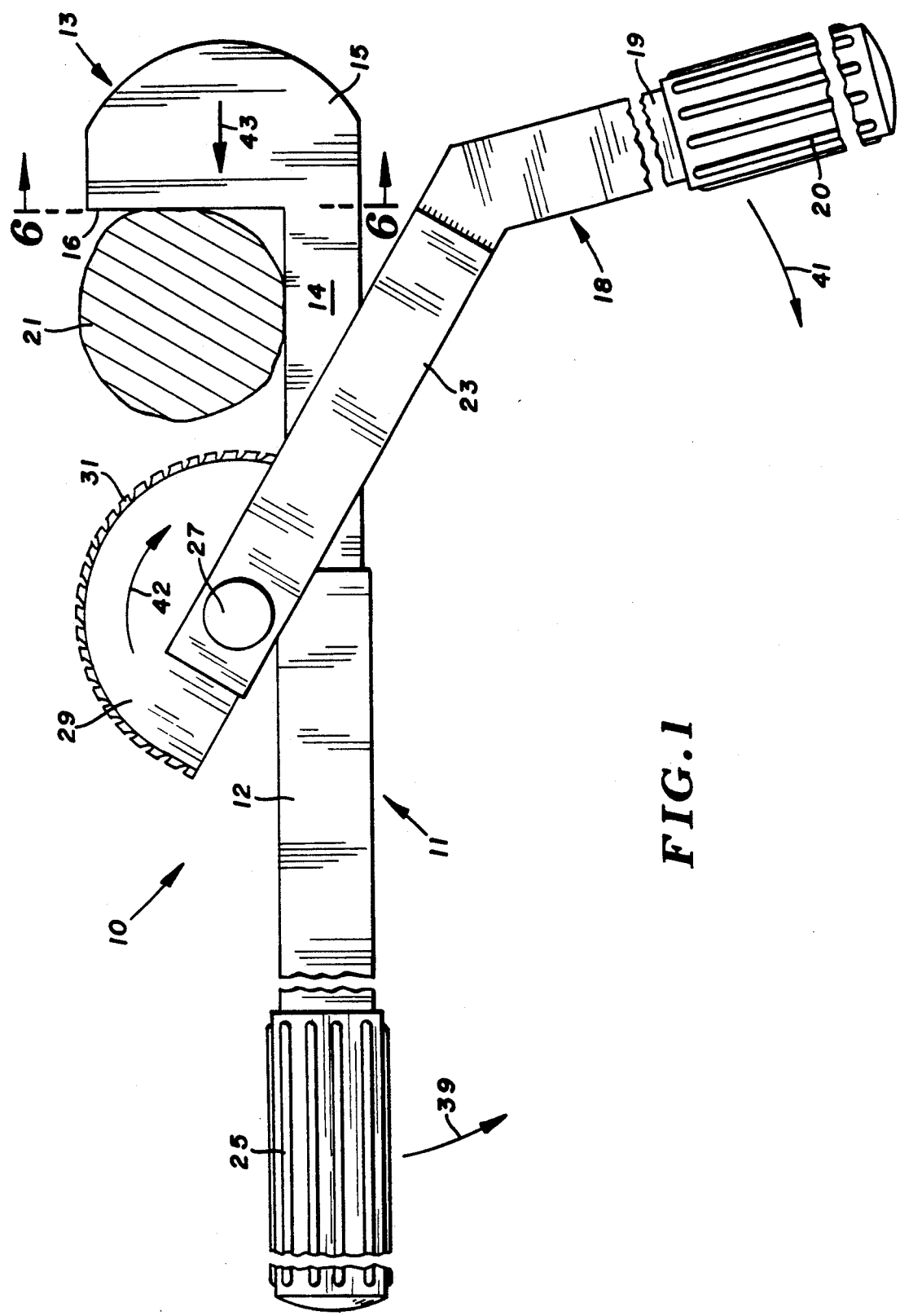
FIG. 1 is a foreshortened side elevational view of the cutting tool of the invention showing the cutting blade in the open position.
Figure 2:
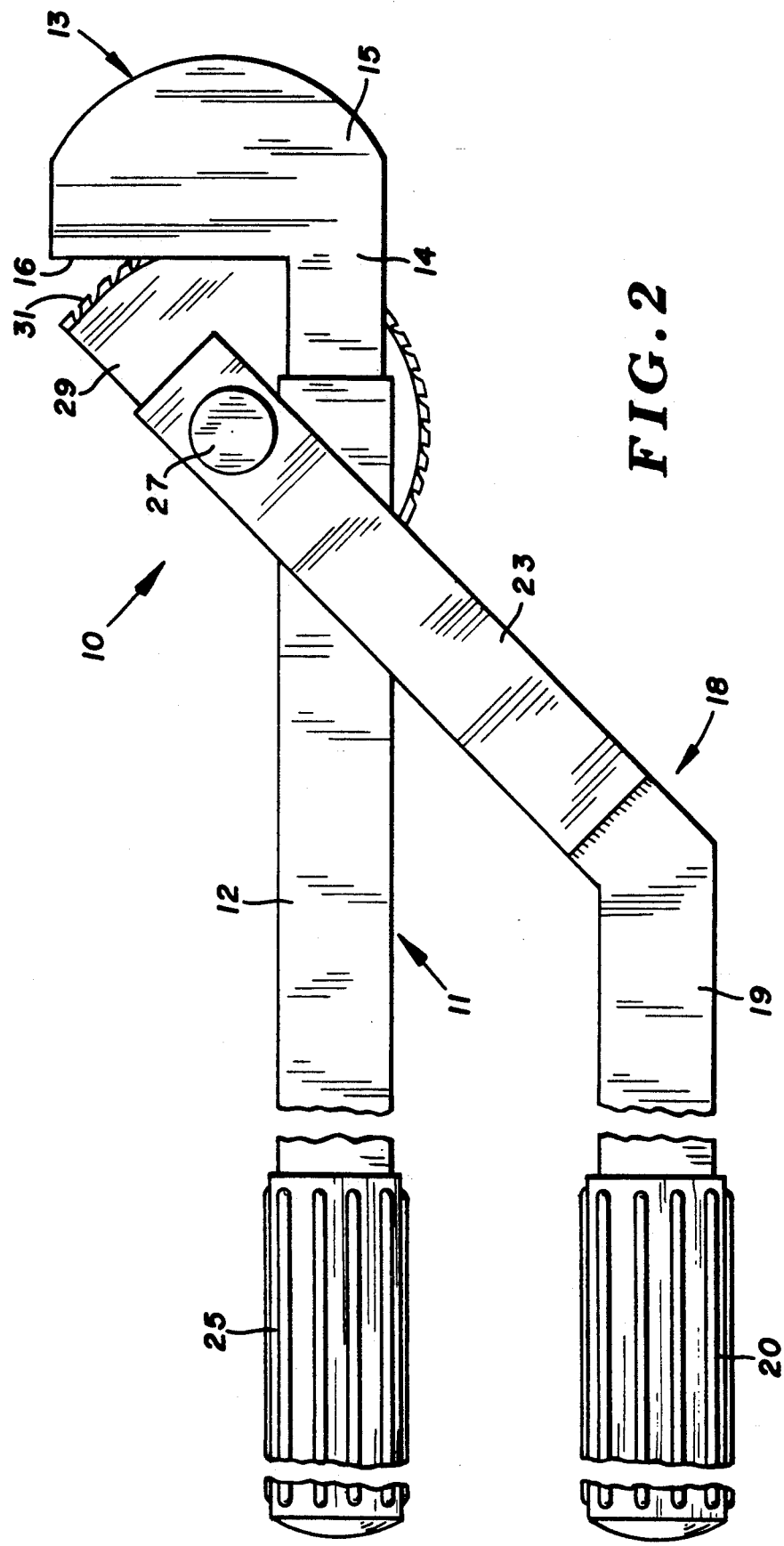
FIG. 2 is a side elevational view of the cutting blade showing the cutting blade in the closed position.

Referring to FIGS. 1 and 2, there is shown a cutting tool or saw cutter, indicated generally at 10, for cutting objects 21, such as tree branches, wood, logs, twigs, plastic material, metal and the like. Tool 10 has an elongated first body or member 11 having an outwardly directed handle 12. A hand grip 25 is located on the outer end of handle 12. A second member comprising an anvil, indicated generally at 13, is movably mounted on the forward end of body 11. Anvil 13 has a inverted generally U-shaped base 14 that slides and telescopes into the passage 44 of handle 12 and an upwardly directed back or jaw 15. Back 15 has an upright, generally flat front face 16. The object 21 bears against front face 16 during the cutting thereof. As seen in FIGS. 5, 6, 7 and 8, base 14 and back 15 have an elongated slot 17 for accommodating a cutting blade 29.

Figure 3:
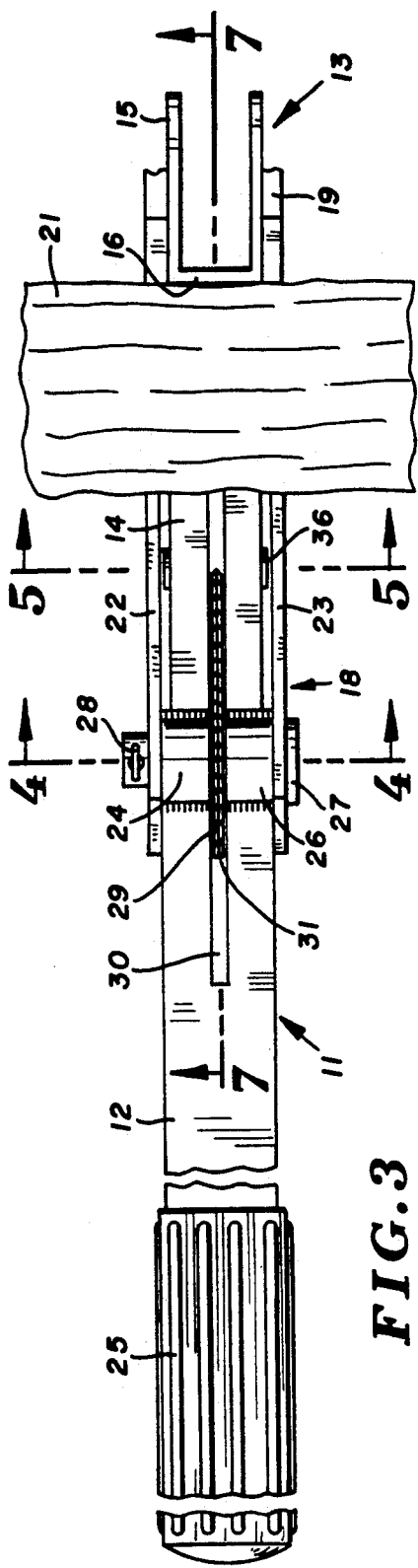
FIG. 3 is a foreshortened top plan view of the cutting tool.
Figure 6:
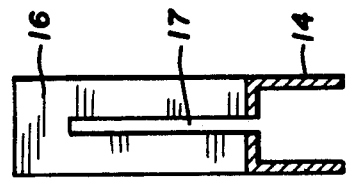
FIG. 6 is an enlarged sectional view taken along the line 6—6 of FIG. 1.
Figure 5:
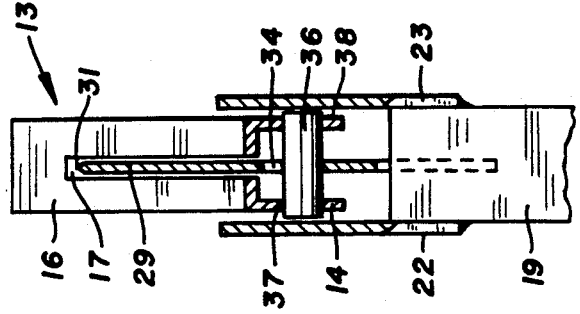
FIG. 5 is an enlarged sectional view taken along the line 5—5 of FIG. 3.
Figure 4:
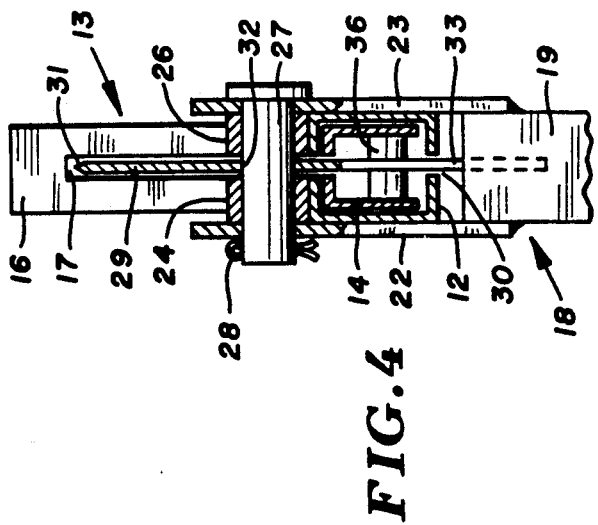
FIG. 4 is an enlarged sectional view taken along the line 4—4 of FIG. 3.
Figure 7:
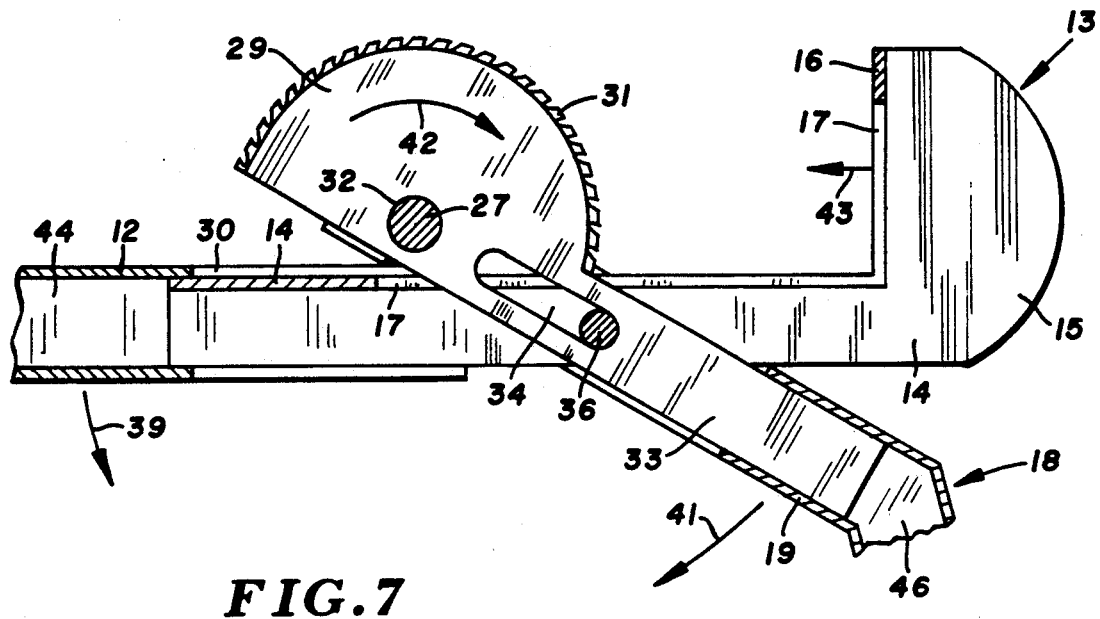
FIG. 7 is an enlarged sectional view taken along the line 7—7 of FIG. 3 showing the cutting blade in the open position.
Figure 8:
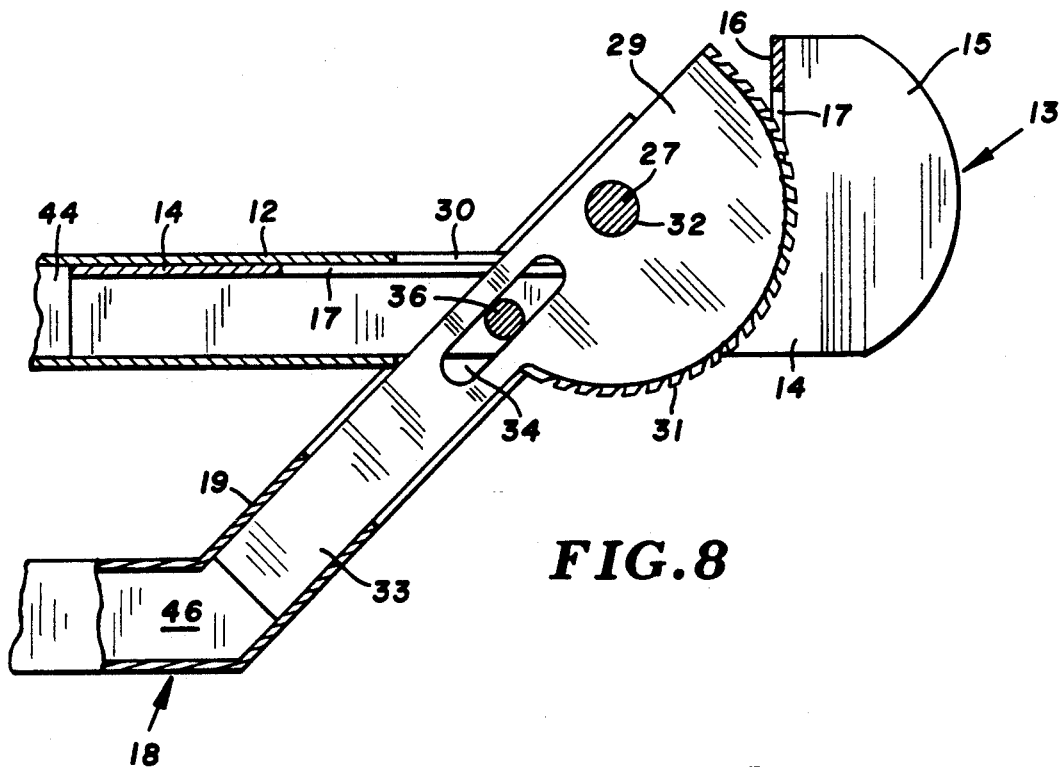
FIG. 8 is a sectional view similar to FIG. 7 showing the cutting blade in the closed position.

A third body or member, indicated generally at 18, is pivotally mounted on body 11. Body 18 has an elongated handle 19 having an angularly inner portion secured to side plates 22 and 23. A hand grip 20 is mounted on the outer end of handle 19. Side plates 22 and 23, as seen in FIG. 3, are located adjacent sleeves or bosses 24 and 26 secured to the top outer end of handle 12. Sleeves 24 and 26, as seen in FIG. 4, have aligned holes that accommodate a pin 27. Pin 27 extends through holes in the outer ends of side plates 22 and 23 to pivotally mount body 18 on body 11. A retainer, such as a cotter pin 28, extends through a hole in the outer end of pin 27 to hold pin 27 in assembled relation with side plates 22 and 23 and sleeves 24 and 26. Sleeves 24 and 26 are laterally spaced from each other to accommodate blade 29. Blade 29 has a circular hole 32 to pivotally mount blade 29 on the center of pin 27. Blade 29 is aligned with a longitudinal slot 30 in the outer end of handle 12 and slot 17 in anvil 13. Blade 29 has a arcuate outer serrated edge, having forwardly inclined teeth 31, facing the upright face 16 of anvil 13. An elongated arm 33 is joined to lower edge of blade 29. Arm 33, as seen in FIGS. 7 and 8, telescopes into passage 46 of tubular handle 19, thereby connecting arm 33 with handle 19. Blade 29 can be removed from tool 10 by removing pin 27 from sleeves 24 and 26 and drawing arm 33 out of the passage 46 of handle 19. A new blade with sharp teeth can replace blade 29. Blade 29 and arm 33 have an elongated slot 34 that accommodates a transverse pin 36, located generally parallel to pin 27 Pin 36 extends through a hole 37 in base 14 of anvil 13. Blade 29 rotates about pin 27, and pin 36 moves in slot 34 so as to move anvil 13 relative to blade 29.

In use, handles 12 and 19 are moved toward each other, as indicated by the arrows 39 and 41. Blade 29, being joined to handle 19, rotates in the direction of arrow 42, moving teeth 31 in a forward or clockwise direction toward the object 21 to be cut. Concurrently, anvil 13 is moved into the passage 44 of handle 12 as pin 36 connects blade 29 with base 14. Blade 29 moves into slot 30 of handle 12. Teeth 33 of blade 29 moves through the upper portion of slot 17 when blade 29 is in the closed position thereby cutting all the objects located between blade 29 and jaw 15.

When handles 12 and 19 are moved apart, blade 32 will return to its initial position, as shown in FIG. 1. The anvil 13 will move out of handle 12. A second object can then be placed between the anvil 13 and blade 29. Movement of the handles 12 and 19 toward each other, will operate to cut the object.

While there has been shown and described a preferred embodiment of the cutting tool of the invention, it is understood that changes in the structure and arrangement of structure and parts may be made by those skilled in the art without departing from the invention. The invention is defined in the following claims.

I claim:

1. A tool for cutting an object comprising: a first member, a second member movably mounted on the first member, said second member having means engageable with the object to be cut, a third member moveable relative to the first member, pivot means pivotally connecting the third member to the first member, blade means having cutting means facing said means of the second member pivotally mounted on the pivot means, means connecting the blade means and the second member, and means connecting the blade means to the third member whereby when the first and third members are moved toward each other, said blade means rotates toward said means of the second member and the second member moves toward said cutting means so as to cut an object located between said cutting means and the means of the second member.

2. The tool of claim 1 wherein: the first member has an elongated handle having an outer end with a passage, said second member has a base telescoped into the passage at the outer end of the handle whereby the second member is movable relative to the first member.

3. The tool of claim 1 wherein: the third member has laterally spaced side plates rotatably mounted on the pivot means, said second member extended between said laterally spaced side plates.

4. The tool of claim 1 wherein: the means connecting the blade means to the third member includes an elongated arm, said third member comprising a handle having an outer end with a passage, said arm extended into the passage of the third member.

5. The tool of claim 1 wherein: the means connecting the blade means and the second member includes a pin extended generally parallel to the pivot means, said blade means having a slot to accommodate said pin.

6. The tool of claim 1 wherein: said first and second members have longitudinally aligned slots, said slots being aligned with the blade means whereby the blade means can move into and out of said slots when the first and third members are moved relative to each other.

7. The tool of claim 1 wherein: the pivot means includes sleeve means connected to the first member, said sleeve means providing a space for the blade means, said blade means having a hole and being located in said space with the hole aligned with said sleeve means, and a pin extended through said sleeve means and hole, said third member having portions with holes accommodating said pin whereby said blade means and third members are pivotally mounted on said pin.

8. The tool of claim 7 wherein: said first member has a slot to accommodate a portion of the blade means.

9. The tool of claim 8 wherein: said second member has a slot aligned with the slot in the first member to accommodate a portion of the blade means during movement of the blade means toward the second member.

10. The tool of claim 7 wherein: the portions of the third member are side plates located adjacent opposite sides of the second member and sleeve means, said side plates having said holes accommodating said pin.

11. The tool of claim 10 wherein: the means connecting the blade means and the second member includes a second pin extended generally parallel to the pivot means and located between said side plates, said blade means having a slot to accommodate the second pin.

12. A tool for cutting an object comprising: a linear elongated first member having a passage open to one end thereof, a second member comprising an anvil having an elongated linear base slideably extended into said passage and a jaw joined to the base and extended upwardly therefrom, a third member having a passage open to one end thereof, movable relative to the first member, pivot means connecting the third member to said one end of the first member, blade means having teeth on an outer peripheral edge thereof having said jaw, said blade means being pivotally mounted on the pivot means whereby the blade means can be selectively rotated toward or away from the jaw, arm means connected to the blade means and projected into the passage of the third member whereby the blade means is rotated upon movement of the first and third members relative to each other, pin means connecting the blade means to the base of the anvil, said blade means having a slot accommodating said pin means whereby on movement of the first and third members toward each other the blade means rotates toward the jaw and the jaw moves toward the blade means so as to cut an object located between said blade means and jaw.

13. The tool of claim 12 wherein: the first member, base and jaw having aligned slots accommodating the blade means during movement of the blade means and anvil.

14. The tool of claim 12 wherein: the third member has side plates pivotally mounted on the pivot means, said base extended between said side plates into said passage of the first member.

15. The tool of claim 12 wherein: the pivot means includes sleeve means connected to said one end of the first member, said sleeve means providing a space for the blade means, said blade means having a hole aligned with the sleeve means, and a pin extended through said sleeve means and hole, said third means having portions with holes accommodating said pin whereby said blade means and third member are pivotally mounted on said pin.

16. The tool of claim 15 wherein: the third member has side plates pivotally mounted on the pivot means, said side plate being located adjacent opposite sides of the sleeve means and base of the anvil, said pin being located between said side plates.

17. A tool for cutting an object comprising: a first member having an end, a second member slideably mounted on the end of the first member, said second member having a jaw engageable with the object to be cut, a third member, pivot means pivotally connecting the third member to the end of the first member, blade means having cutting means facing said jaw pivotally mounted on said pivot means, means connecting the blade means to said third member whereby said blade means is pivoted relative to the pivot means on movement of the third means, and pin means connecting the blade means to the second member whereby when the first and third members are moved toward each other the blade means rotates toward the jaw and the second member and jaw moves toward the cutting means of the blade means so as to cut an object located between said cutting means and jaw.

18. The tool of claim 17 wherein: the first member, second member and jaw have aligned slots accommodating the blade means during movement of the blade means and second member.

19. The tool of claim 17 wherein: the third member has side plates pivotally mounted on the pivot means, said second member extended between said side plates.

20. The tool of claim 17 wherein: the pivot means includes sleeve means connected to said end of the first member, said sleeve means providing a space for the blade means, said blade means having a hole aligned with the sleeve means, and a pin extended through said sleeve means and hole, said third means having portions with holes accommodating said pin whereby said blade means and third member are pivotally mounted on said pin.

21. The tool of claim 20 wherein: the third member has side plates pivotally mounted on the pivot means, said side plates being located adjacent opposite sides of the sleeve means and the second member.

22. The tool of claim 21 wherein: the pin means connecting the blade means to the second member is located between said side plates, said blade means having a slot to accommodate said pin means whereby on pivotal movement of the blade means, the jaw is moved relative to the blade means.

* * * * *